3,456,019
ETHER ALCOHOLS
Gordon Foster, Ascot, and Peter Johnson, Brookwood, Woking, England, assignors to The British Petroleum Company Limited, London, England, a corporation of Great Britain
No Drawing. Filed Mar. 29, 1967, Ser. No. 626,699
Claims priority, application Great Britain, Apr. 7, 1966, 15,518/66
Int. Cl. C07c *43/10, 41/10*
U.S. Cl. 260—615          5 Claims

ABSTRACT OF THE DISCLOSURE

Olefins such as hexene dimers are halogenated, preferably with chlorine to give allylic halides which are contacted at elevated temperature with a glycol in the presence of a base (preferably sodium carbonate) to give alkoxylated alcohols which all contain the same number of alkylene oxide units.

---

This invention relates to a process for the production of alkoxylated alcohols.

A process for the production of ethoxylated alcohols has been disclosed in which an alcohol is ethoxylated with ethylene oxide. In this process the resulting ethoxylated alcohols do not all contain the same number of ethylene oxide units.

According to the present invention there is provided a process for the production of an alkoxylated alcohol which process comprises halogenating an olefinic hydrocarbon to form an allylic halide and solvolysing the allylic halide with a glycol in the presence of a base.

Preferably the olefin has a carbon number in the range $C_3$ to $C_{20}$. Very suitable olefinic feedstocks may be prepared by the acid catalysed dimerisation of n-hexenes. Such feedstocks consist mainly of olefins with the double bond attached to a carbon atom attached to no hydrogen atoms. n-Hexenes may be prepared by dimerising propylene in the presence of a cobalt/charcoal catalyst.

The preferred halogen is chlorine. Chlorination is preferably effected by contacting the olefin with chlorine at a temperature in the range −20 to 100° C. for branched chain olefins and 300 to 600° C. for straight chain olefins.

Typical glycols which may be used as solvolysing agents include ethylene glycol, diethylene glycol and triethylene glycol. The products will be mono-, di-, and tri-ethoxylated alcohols, respectively.

The preferred base is sodium carbonate.

Preferably solvolysis is effected at a temperature in the range 50 to 250° C.

It is an advantage of the process according to the present invention that the resulting alkoxylated alcohols all contain an exact number of alkylene oxide units, the actual number depending on the glycol employed. Thus a greater degree of control on the synthesis of alkoxylated alcohols is provided.

The alkoxylated alcohols are suitable for use in the manufacture of detergents. Since they are unsaturated compounds it may be necessary to hydrogenate them. This can be done by conventional methods. The invention is illustrated with reference to the following examples.

Examples 1–4

Chlorine was bubbled through hexene dimer for 3 hours at 5° C. Nitrogen was then passed through the solution to remove any hydrogen chloride and unreacted chlorine.

The resulting mixture of allylic chlorides in olefin was stirred at reflux temperature (180–200° C.) for 3 hours with a glycol and sodium hydroxide or sodium carbonate. A small amount of water was formed which was trapped and removed by a Dean and Starke distillation head. The mixture was cooled and separated by ether/water extraction.

The unreacted glycol and sodium salts dissolved in the aqueous layer; the unreacted hydrocarbons ethoxylated alcohols and other products dissolved in the ether layer. The ethoxylated alcohols were finally isolated by distillation.

Reaction conditions and products are shown in the following table.

The hexene dimer was prepared by dimerising propylene in the presence of a cobalt/charcoal catalyst to a hexene fraction and dimerising the hexene fraction in the presence of silica/alumina.

TABLE

| | Chlorination Step | | Solvolysis Step | | | Results | | | |
|---|---|---|---|---|---|---|---|---|---|
| Example | Hexene Dimer Feed, wt. g. | Chlorine Uptake, g. | Glycol, wt. g. | Alkali, wt. g. | Temperature, °C. | Overall Hexene Dimer Conversion, percent | $C_{12}$ Alcohols and $C_{12}$ Chlorides | Ethoxylated Alcohols | High Boilers |
| 1 | 98.4 | 9.9 | Ethylene glycol, 220 | NaOH, 40 | 180 | 26 | 18 | [1] 73 | 9 |
| 2 | 92.7 | 11.5 | Diethylene glycol, 220 | NaOH, 40 | 180 | 29 | 18 | [2] 70 | 12 |
| 3 | 97.2 | 16.8 | Triethylene glycol, 220 | NaOH, 40 | 180 | 32 | 17 | [3] 74 | 9 |
| 4 | 103.3 | 9.5 | Triethylene glycol, 227 | $Na_2CO_3$, 40 | 200 | 25 | 5 | [3] 84 | 11 |

[1] $C_{12}H_{23}OCH_2CH_2OH$.    [2] $C_{12}H_{23}(OCH_2CH_2)_2OH$.    [3] $C_{12}H_{23}(OCH_2CH_2)_3OH$.

What we claim is:

1. A process for the production of an ether alcohol product which process comprises chlorinating a feedstock consisting essentially of dimers of n-hexenes at a temperature in the range −20° C. to 100° C. to form a mixture consisting essentially of allylic chlorides and contacting the mixture consisting essentially of allylic chlorides with a glycol selected from the group consisting of ethylene glycol, diethylene glycol and triethylene glycol in the presence of a base selected from the group consisting of sodium hydroxide and sodium carbonate at a temperature in the range of about 180° C. to about 200° C. to form ether alcohols.

2. Process according to claim 1 where the base is sodium carbonate.

3. Process according to claim 1 where the glycol is ethylene glycol and the ether alcohol product is $$C_{12}H_{23}OCH_2CH_2OH$$

4. Process according to claim 1 where the glycol is diethylene glycol and the ether alcohol product is

5. Process according to claim 1 where the glycol is triethylene glycol and the ether alcohol product is

References Cited

UNITED STATES PATENTS

| | | |
|---|---|---|
| 2,130,084 | 9/1938 | Groll et al. |
| 2,594,935 | 4/1952 | Ladd et al. _____ 260—615 XR |
| 2,664,342 | 12/1953 | Johnson. |
| 2,667,508 | 1/1954 | Towle et al. |
| 2,729,623 | 1/1956 | Gregg. |
| 2,777,883 | 1/1957 | Chambers et al. |
| 2,783,285 | 2/1957 | Chambers et al. |
| 2,841,621 | 7/1858 | Riley. |
| 3,332,989 | 7/1967 | Snyder et al. ___ 260—683.15 XR |
| 3,333,016 | 7/1967 | Schultz _____ 260—683.15 |
| 3,356,749 | 12/1967 | Van Dijk. |

FOREIGN PATENTS

| | | |
|---|---|---|
| 1,065,401 | 9/1959 | Germany. |
| 988,123 | 4/1965 | Great Britain. |
| 172,768 | 7/1963 | Russia. |

BERNARD HELFIN, Primary Examiner

HOWARD T. MARS, Assistant Examiner

U.S. Cl. X.R.

260—654